US011520478B2

(12) United States Patent
Gerlach et al.

(10) Patent No.: US 11,520,478 B2
(45) Date of Patent: Dec. 6, 2022

(54) SINGLE-HANDED USER INTERFACE

(71) Applicant: NCR Corporation, Atlanta, GA (US)

(72) Inventors: Tim Gerlach, Walnut Creek, CA (US); Husameldin M Ali Ibrahim, San Francisco, CA (US); Tomasz Kruczek, Fremont, CA (US); Bruce McBain, Pleasanton, CA (US); Garrett Paul Schubiner, Burlingame, CA (US)

(73) Assignee: NCR Corporation, Atlanta, GA (US)

( * ) Notice: Subject to any disclaimer, the term of this patent is extended or adjusted under 35 U.S.C. 154(b) by 64 days.

(21) Appl. No.: 16/221,468

(22) Filed: Dec. 15, 2018

(65) Prior Publication Data
US 2020/0192563 A1 Jun. 18, 2020

(51) Int. Cl.
G06F 3/0482 (2013.01)
G06F 3/04886 (2022.01)
G06F 3/04883 (2022.01)
G06F 3/04845 (2022.01)

(52) U.S. Cl.
CPC ........ G06F 3/04883 (2013.01); G06F 3/0482 (2013.01); G06F 3/04845 (2013.01); G06F 3/04886 (2013.01)

(58) Field of Classification Search
None
See application file for complete search history.

(56) References Cited

U.S. PATENT DOCUMENTS

| 8,769,431 | B1* | 7/2014 | Prasad | G06F 3/048 715/788 |
| 2007/0094597 | A1* | 4/2007 | Rostom | H04L 67/36 715/700 |
| 2007/0226640 | A1* | 9/2007 | Holbrook | G06F 16/951 715/765 |
| 2013/0227495 | A1* | 8/2013 | Rydenhag | G06F 3/0484 715/863 |
| 2014/0111451 | A1* | 4/2014 | Park | G06F 3/04883 345/173 |
| 2015/0089386 | A1* | 3/2015 | Brisebois | G06F 3/04817 715/746 |
| 2016/0018960 | A1* | 1/2016 | Feng | G06F 3/0412 715/762 |
| 2016/0026345 | A1* | 1/2016 | Yao | G06F 3/0488 715/815 |
| 2016/0179338 | A1* | 6/2016 | Miller | G06F 3/04886 345/174 |
| 2017/0115794 | A1* | 4/2017 | Carteri | G06F 3/0488 |
| 2017/0192627 | A1* | 7/2017 | Agnoli | G06F 3/04845 |
| 2017/0329489 | A1* | 11/2017 | Arakawa | G06F 3/0346 |
| 2018/0189073 | A1* | 7/2018 | Larabie-Belanger | G06F 9/542 |

* cited by examiner

Primary Examiner — Christopher J Fibbi
(74) Attorney, Agent, or Firm — Schwegman, Lundberg & Woessner

(57) ABSTRACT

A single-handed user interface is provided. Responsive to a single action provided by a single hand of a user when touching a touchscreen display, a first screen is rendered by the interface on the touchscreen display, which configures the interface for operation by the user while using one hand. Further second screens are rendered based on selections provided by the user while using the hand to navigate features of an application associated with the interface. Each feature provided by the application is accessible though the rendered screens by the single hand of the user. In an embodiment, each feature of the application is accessible through the rendered screens by a thumb of the user.

12 Claims, 17 Drawing Sheets

SWIPE RIGHT WITH RIGHT HAND

START POSITION

START SWIPING TO LEFT

MENU DOCKS ON LEFT

REACH FROM TOP

REACH TO BOTTOM

SWIPE RIGHT WITH RIGHT HAND

MENU DOCKS TO RIGHT SIDE

REACH FROM TOP

REACH TO BOTTOM

SINGLE-HANDED USER INTERFACE

BACKGROUND

Mobile devices play a prominent role in nearly every aspect of one's day. Computing power and wireless networking capabilities have been miniaturized, such that no device is too small to have the functionality of a traditional desktop computer hardwired to a network. In fact, users can user mobile watches to make/receive voice calls, send text/receive messages, browser the Internet, and perform online transactions.

One problem with miniaturized devices for some people is the size of the display. Some people struggle to view information presented on these small screens (particularly watch display screens).

Another problem, occurs when the user attempts to make a selection and/or provide input from the device's touch screen display. In fact, many people believed that users would never give up a traditional keyboard-type interface because users were used to entering information via traditional input keys associated with desktop computers. But the desire to miniaturize resulted in touch screens for mobile devices with soft keys (keys rendered on the display for use during user input). This was also done to maintain or increase the viewable area of the display by eliminating a need for hardware input keys on the mobile device.

As a result, users have adapted to mobile devices with no separate area for physical input keys. Soon users became adept at using their thumbs to input information through the soft keys rendered on the mobile device display. Now, many teenagers can type faster using their thumbs, then adults can type on a full-sized traditional keyboard.

Users are also becoming more and more reliant on their mobile devices, such that their devices are always carried by them. Consequently, users often try to do more than they are capable of doing with their mobile devices, such as using one hand for one task and another hand for operating their mobile device. This can be done for a variety of reasons, some legitimate (carrying something in one hand while operating their mobile device in the other hand) and some probably unwise if not unlawful (such as while driving a car and attempting to respond to a text message or even just reading a text message).

To date, the interfaces on these small display screens are designed with functionality that are intended to be operated by the user with both of the user's hands, even though this is not the way many users are operating their devices. Furthermore, the existing interfaces fail to account for the fact that many users are becoming adept at using their thumbs to interact with their mobile display touch screens.

SUMMARY

In various embodiments, methods and a system for a single-handed user interface are provided.

In one embodiment, a method for operating a single-handed interface is provided. A touch action is identified from a touchscreen display originated from a center of the touchscreen display and moving to one side away from the center. A user interface (UI) is rendered on the touchscreen display in a single hand mode of operation based on the touch action and the one side.

DETAILED DESCRIPTION

Figure 1A:
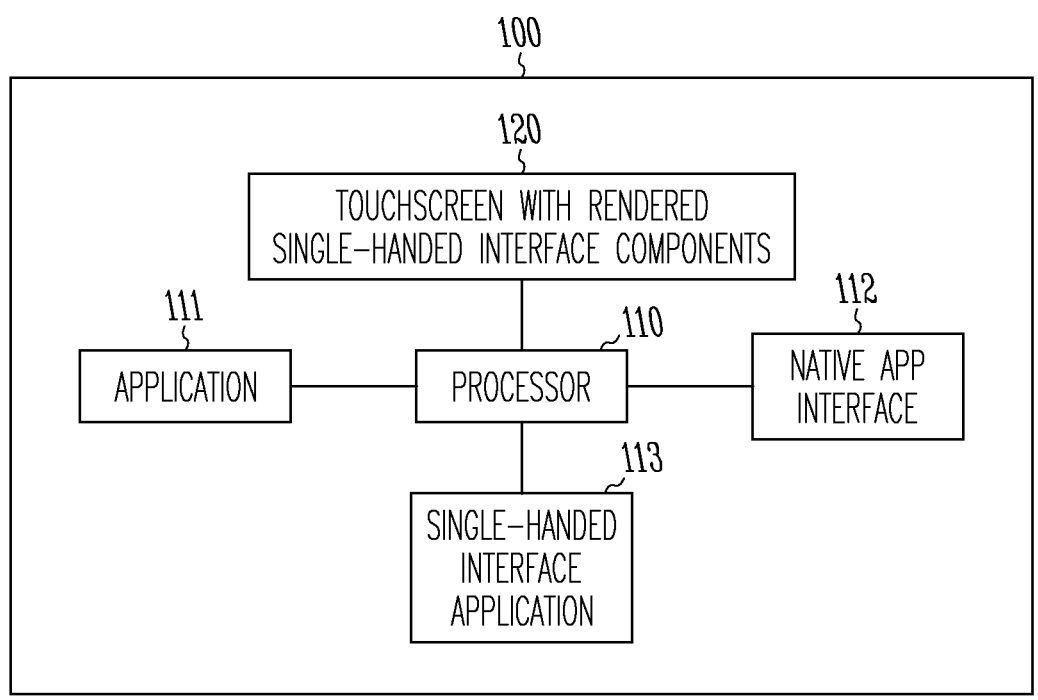
FIG. 1A is a diagram of a device having a single-handed user interface, according to an example embodiment.

FIG. 1A is a diagram of a device 100 having a single-handed user interface, according to an example embodiment. It is to be noted that the device 100 is shown in greatly simplified form with only those components relevant to understanding what has been added and modified to a conventional device for purposes of providing an enhanced device 100 having and operating the single-handed user interface.

The device 100 includes a processor 110, an application 111, a novel single-handed interface application 113, and a touchscreen display with rendered single-handed interface components 120 (herein after just "touchscreen 120"). Optionally, the device 100 includes a native or existing and legacy user-facing interface 112.

The application 111, the single-handed interface application 113 (hereinafter just "interface app 113"), and the native application ("app") interface 112 are implemented as executable instructions that residing in a non-transitory computer-readable storage medium and that are executed by the processor 110.

As used herein "components" refer to software constructs (such as objects) that have displayed or rendered attributes (visible on the touchscreen 120) and that are associated with or linked to features (functions and processing) of the application 111. Such that when a user takes an action (makes a touch) on the touchscreen 120 in a location of a visible rendered attribute for a component, the application 111 is notified of the selection as being associated with user-provided input made with respect to that component.

The interface app 113 provides the processing link between the application 111 and the user-provided input by rendering the available features for the application 111 as single-handed interface components that are tailored to either a right-handed user operator of the device 100 or a left-handed user operator of the device 100. User input made on the touchscreen 120 with respect to the rendered components, are provided back to the application 111 during processing of the application 111.

Some example components for an example application are discussed with reference to rendered screens of the interface app 113 depicted in the FIGS. 1B-1N. It is to be understood, that the specific application 111 and specific components for the features of the application 111, as depicted in the figure discussions that follow, can be changed and tailored by the interface app 113, such that any desired application or legacy existing user app interface 112 can be interfaced to the interface app 113 (such as through an API) and the novel rendered single-handed configured interface discussed herein provided.

When the application 111 is initiated for processing on the device 100, the initial user-facing interface screen is rendered on the touchscreen 120 by the interface app 113 substantially centered vertically on the touchscreen 120. From this initial (home or starting configuration), the user can interact with the home screen to cause the interface app 113 to configure subsequent selections made by the user of the components (feature options) to be operable for a right-handed user or a left-handed user.

The application 111 features/functions dictate when components are presented on the touchscreen 120 by the interface app 113. Such that as the user makes selections by touching the components presented/rendered on the touchscreen 120, the next rendered screen is determined by the application 111 based on that selection and the interface app 113 will continue to render the subsequent screens in either a right-handed mode of operation or a left-handed mode of operation. Furthermore, when any presented screen is provided in one mode of operation (right-handed for instance), the interface app 113 may provide a reserved touch-based option that if activated by the user will cause the interface app 113 to either place the currently rendered screen in a different mode of operation (left-handed for instance) or move the currently rendered screen to the home screen (starting position).

The interface app 113 also is capable of rendering the right-handed mode of operation and the left-handed mode of operation with a layout that is circular-based/centric (as shown in the FIGS. 1B-1J) or with a layout that is linear-based/centric (as shown in the FIGS. 1K-1N).

The presented modes and layout provide device functionality because the modes and layouts are optimized to allow user interaction with the user interface rendered on the touchscreen 120 using a single thumb of one hand while also holding the device 100 in the same hand as the thumb that provides the user interaction with the components of the user interface. The offsets from the left and the right edges of the touchscreen 120 as well as the center of the touchscreen 120 are accounted for to determine the optimal placement of the components of the user interface (UI), such that the thumb of a user while holding the device 100 can easily reach all the available features (by touching a rendered component using the thumb) from top to bottom and to the center. Accordingly, the user access all features of any rendered screen with a single thumb while holding the device 100. Moreover, the dominate hand of the user is accounted for by allowing both a right-handed configured mode of operation and a left-handed mode of operation. Thus, the placement of the rendered components provide accessibility functionality for a user accessing an application 111 of the device 100.

In an embodiment, the interface app 113 is implemented as an Application Programming Interface (API) that provides operations for mapping interface components of a native app and user facing interface 112 to the components rendered on the touchscreen 120 by the interface app 113. The APP also provides user selections/inputs made (by touch) on the components rendered on the touchscreen 120 back to the native app user facing interface 112. In this way, a legacy user-facing interface 112 can be operated by a user when interacting with features provided by the application (app) 111 through the new an novel interface app 113 (described more completely herein and below).

Figure 1B:
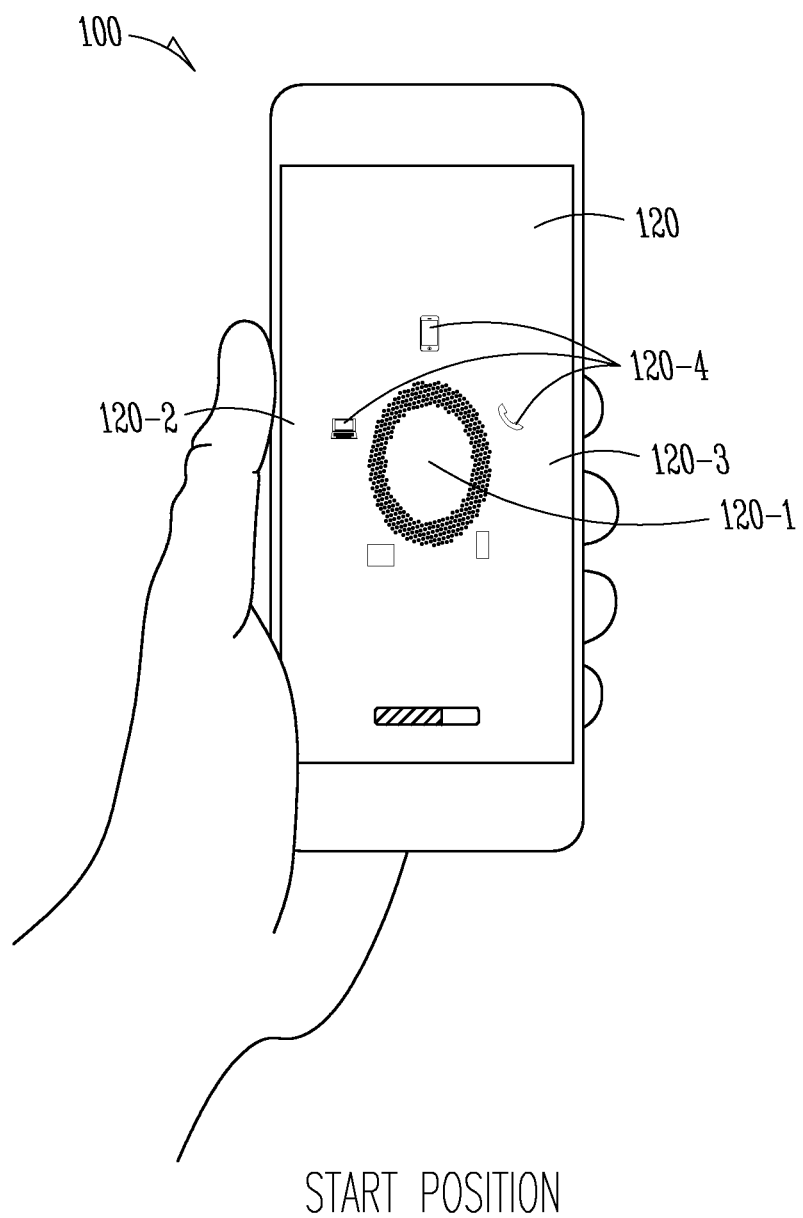
FIG. 1B is a diagram depicting an initial screen rendered by the single-handed user interface in a home or starting position, according to an example embodiment.

FIG. 1B is a diagram depicting an initial screen rendered by the single-handed user interface in a home or starting position, according to an example embodiment.

The FIG. 1B illustrates a circular-based centric layout embodiment for the interface app 113. The components provided on an initial startup of the application 111 are organized in a circular arrangement from the center 120-1 of the touchscreen 120. A slight offset from the left 120-2 includes no presented components as well as a slight offset from the right 120-3. The application-provided features are rendered graphically as icons 120-4 around a circular-based menu.

From this initial UI layout, the user can grasp the device 100 with a single hand and access the center of the menu with a thumb of the same hand to place the UI (the interface app 113) in either a right-handed mode of operation or a left-handed mode of operation.

Figure 1C:
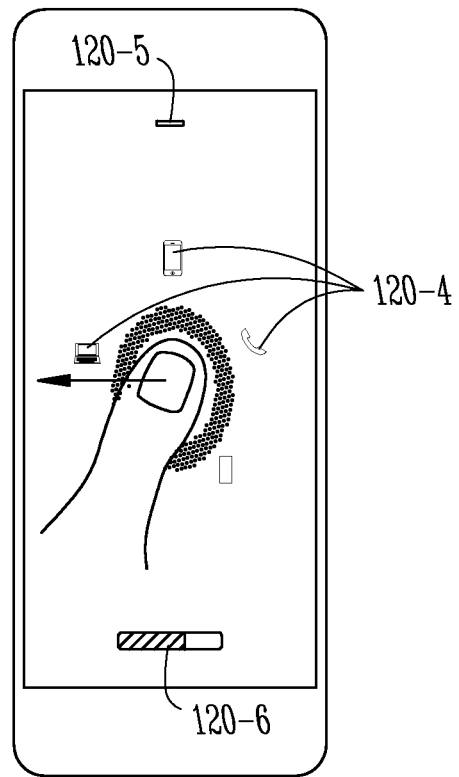
FIG. 1C is a diagram depicting a user interacting with the single-handed user interface to move the interface to a left-handed configuration from the starting position, according to an example embodiment.

FIG. 1C is a diagram depicting a user interacting with the single-handed user interface to move the interface to a left-handed configuration from the starting position, according to an example embodiment.

In an embodiment shown in the FIG. 1C, the user places the thumb in the center 120-1 and maintains contact with the touchscreen 120 while swiping the surface of the touchscreen to the left before releasing contract of the thumb with the surface of the touchscreen 120.

The FIG. 1C also illustrates that other information of components associated with the application 111 can be depicted at the top of the touchscreen display 120-5 and at the bottom of the touchscreen display 120-6.

It is also to be noted that text descriptions may be rendered with each of the presented icons 120-4.

Figure 1D:
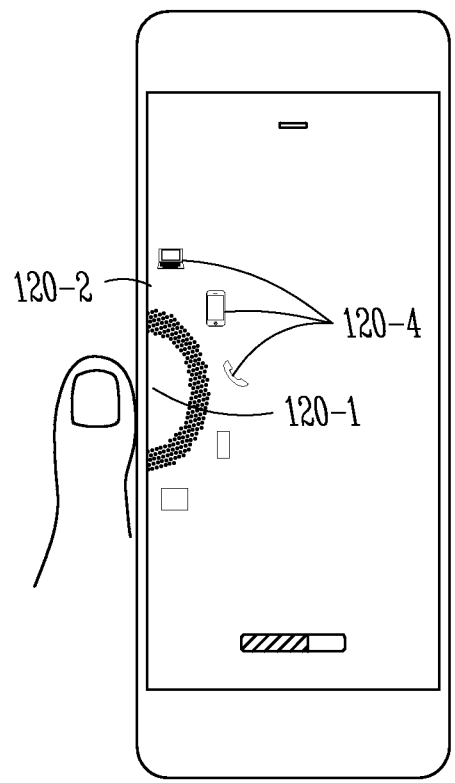
FIG. 1D is a diagram depicting the single-handed user interface configured for a left-handed user, according to an example embodiment.

FIG. 1D is a diagram depicting the single-handed user interface configured for a left-handed user, according to an example embodiment.

Once the user has performed a swipe to the left from the center 120-1, the interface app 113 re-renders the screen as presented in the FIGS. 1B and 1C with the rendered components docked to the left side of the touchscreen 120 (shown in the FIG. 1D) while maintaining a slight offset 120-2 from the left side where no rendered components are presented. Each of the available options/features associated with the selectable icons 120-4 are reorganized about a semi-circle on the left-hand side of the touchscreen 120. The user still has access to each of the icons 120-4 provided in the home or starting position (FIG. 1B) in the left-handed mode of operation. The diameter of the circle rendered in the screen for the FIG. 1B is increased as a larger semicircle and the icons 120-4 are redistributed along the semicircle.

Figure 1E:
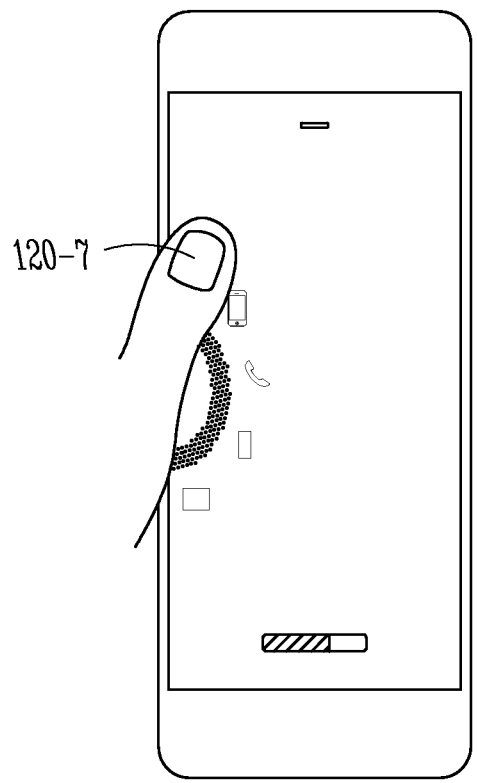
FIG. 1E is a diagram depicting a top-reach of a user in making a selection of a menu item when the single-handed user interface is in a left-handed configuration, according to an example embodiment.

FIG. 1E is a diagram depicting a top-reach of a user in making a selection of a menu item when the single-handed user interface is in a left-handed configuration, according to an example embodiment.

The FIG. 1E shows the topmost icon 120-7 from the FIG. 1D is reachable for selection by the user with the thumb that holds the device 100 in the left-handed mode of operation for the interface app 113.

Figure 1F:
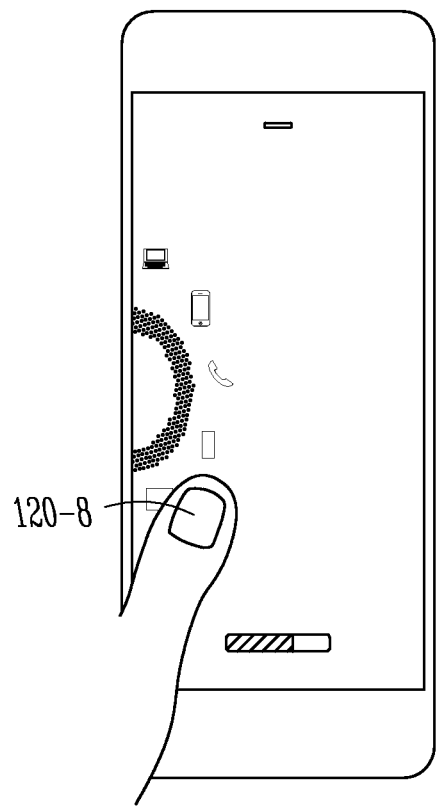
FIG. 1F is a diagram depicting a bottom reach of a user making a selection of a menu item when the single-handed user interface is in a left-handed configuration, according to an example embodiment.

FIG. 1F is a diagram depicting a bottom reach of a user making a selection of a menu item when the single-handed user interface is in a left-handed configuration, according to an example embodiment.

The FIG. 1F shows that the bottommost icon 120-8 is reachable for selection by the user with the thumb that holds the device 100 in the left-handed mode of operation for the interface app 113.

Figure 1G:
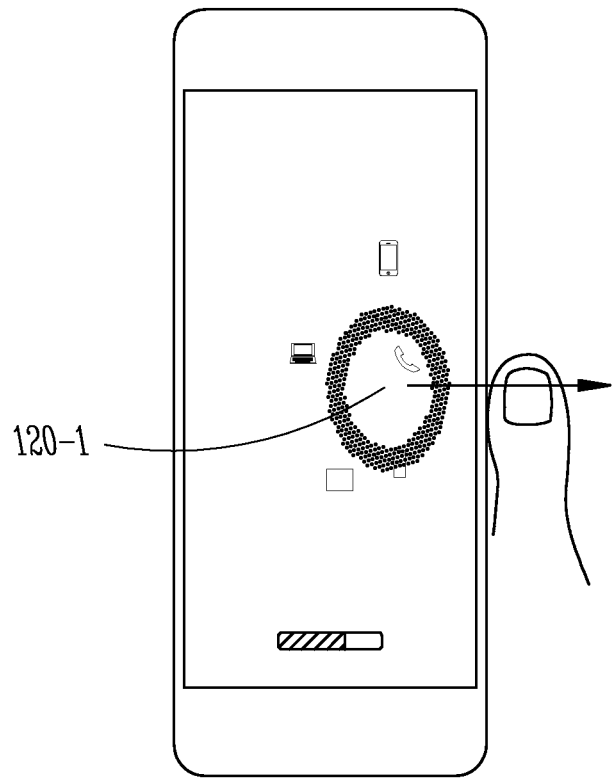
FIG. 1G is a diagram depicting a screen rendered by the single-handed user interface when a user initially places the interface in a right-handed configuration, according to an example embodiment.

FIG. 1G is a diagram depicting a screen rendered by the single-handed user interface when a user initially places the interface in a right-handed configuration, according to an example embodiment.

The FIG. 1G illustrates that the user can place the device 100 in a right hand and perform a similar swipe to the right touch as was discussed with the FIG. 1C to place the interface app 113 in a right handed mode of operation so that the user can operate the device 100 and interact with the application 111 using the UI rendered by the interface app 113 with the users right hand and right thumb while the user holds the device 100 in the user's right hand.

Figure 1H:
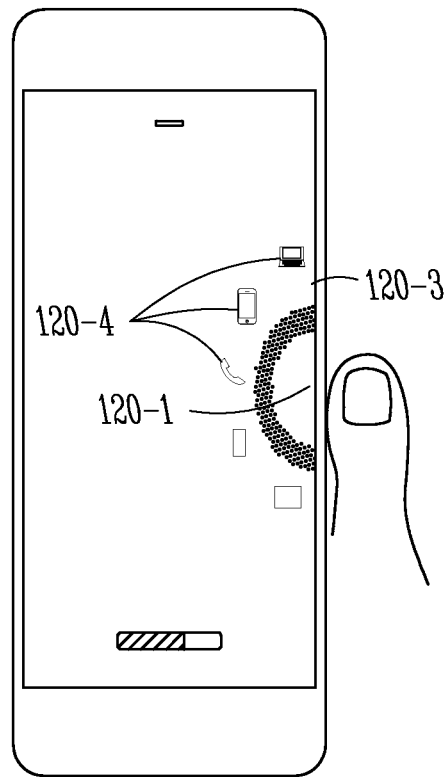
FIG. 1H is a diagram depicting the single-handed user interface configured for a right-handed user, according to an example embodiment.

FIG. 1H is a diagram depicting the single-handed user interface configured for a right-handed user, according to an example embodiment.

After performing the swipe to the right from the center 120-1, the interface app 113 docks the UI and the interface components to the right while maintaining a slight offset 120-3 on the right edge of the touchscreen 120. Again, all the available UI components rendered in the screen presented in the FIG. 1G are presented as icons 120-4 reorganized about a larger diameter semicircle that extends from the right edge of the touchscreen 120.

Figure 1I:
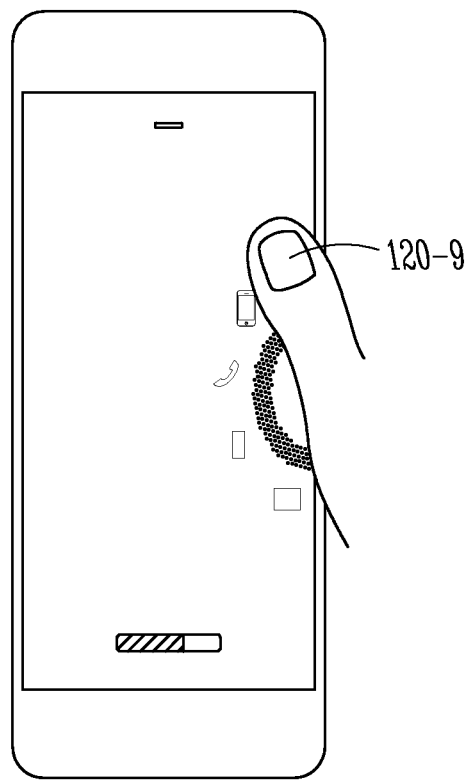
FIG. 1I is a diagram depicting a top-reach of a user in making a selection of a menu item when the single-handed user interface is in a right-handed configuration, according to an example embodiment.

FIG. 1I is a diagram depicting a top-reach of a user in making a selection of a menu item when the single-handed user interface is in a right-handed configuration, according to an example embodiment.

While in the right-handed mode of operation, the user can reach the topmost component icon 120-9 with the user's right thumb while holding the device 100.

Figure 1J:
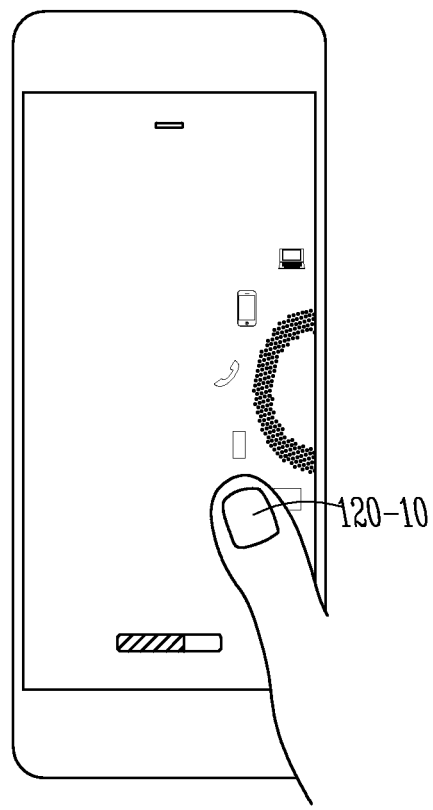
FIG. 1J is a diagram depicting a bottom reach of a user making a selection of a menu item when the single-handed user interface is in a right-handed configuration, according to an example embodiment.

FIG. 1J is a diagram depicting a bottom reach of a user making a selection of a menu item when the single-handed user interface is in a right-handed configuration, according to an example embodiment.

While in the right-handed mode of operation, the user can reach and select the bottommost component icon 120-10 with the user's right thumb while still holding the device 100.

Figure 1K:
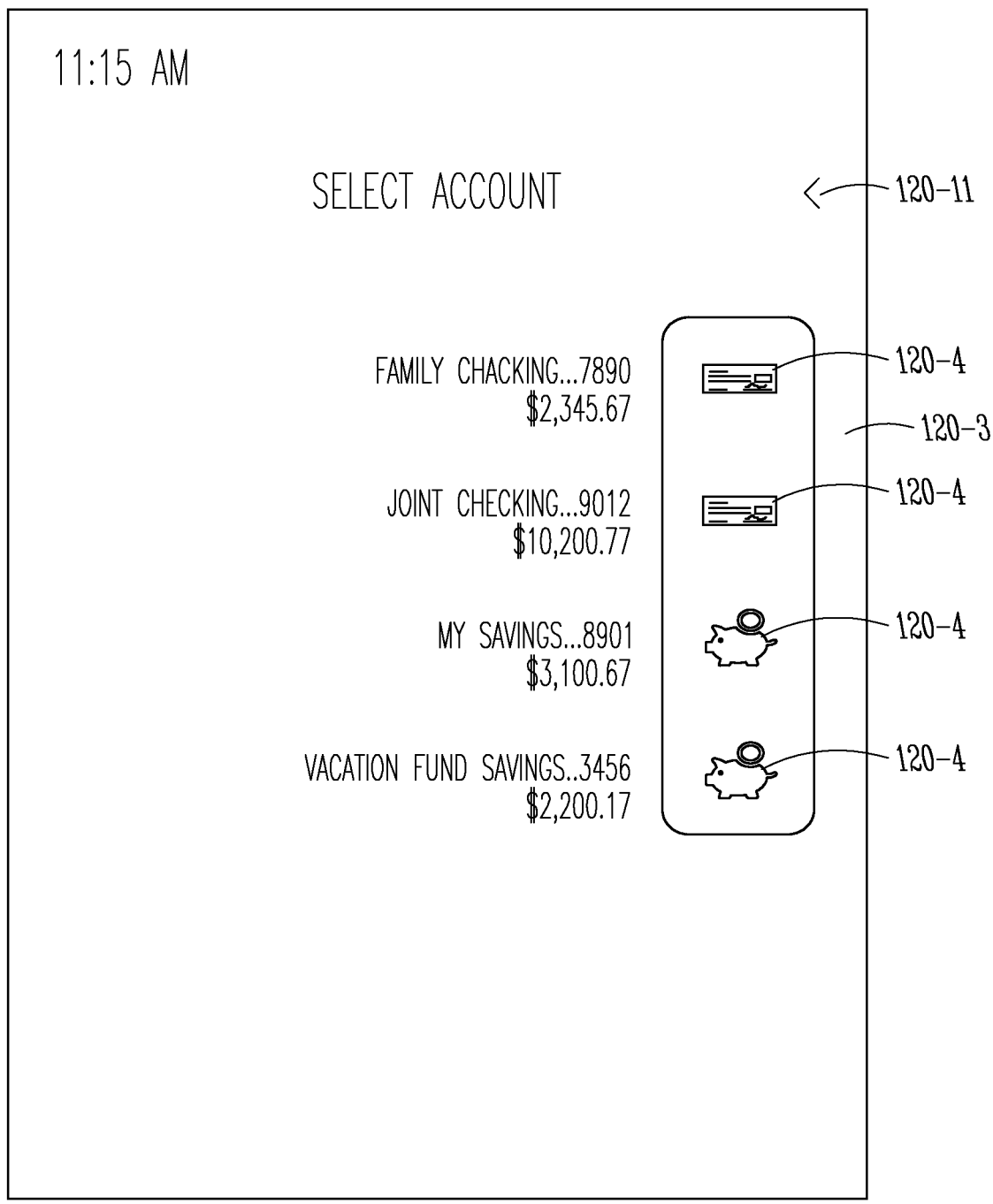
FIG. 1K is a diagram depicting a linear right-handed configuration for the single-handed user interface, according to an example embodiment.

FIG. 1K is a diagram depicting a linear right-handed configuration for the single-handed user interface, according to an example embodiment.

The FIG. 1K illustrates a linear-based/centric layout rendered on the touchscreen 120 by the interface app 113. Here, the component icons 120-4 are rendered in a straight line from top to bottom and justified to the right for a right-handed mode of operation.

The FIG. 1K also illustrates navigation component icons, such as 120-11 that allows the user to use a right thumb and navigate from the current rendered screen to a previously rendered screen.

Figure 1L:
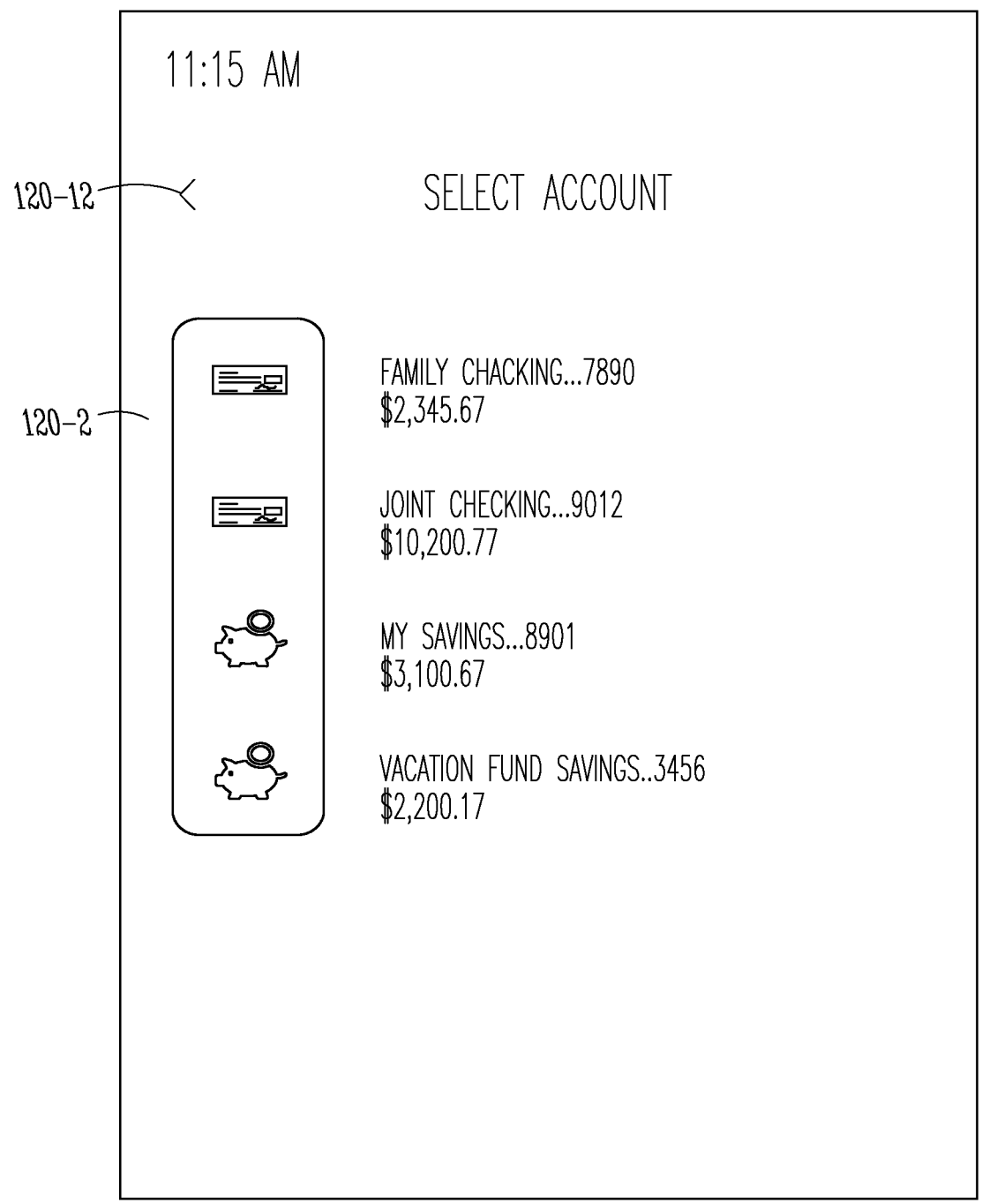
FIG. 1L is a diagram depicting a linear left-handed configuration for the single-handed user interface, according to an example embodiment.

FIG. 1L is a diagram depicting a linear left-handed configuration for the single-handed user interface, according to an example embodiment.

The FIG. 1L illustrates a linear-based/centric layout rendered on the touchscreen 120 by the interface app 113. Here, the component icons 120-4 are rendered in a straight line from top to bottom and justified to the left for a left-handed mode of operation.

The FIG. 1L also illustrates navigation component icons, such as 120-12 that allows the user to use a right thumb and navigate from the current rendered screen to a previously rendered screen.

Figure 1M:
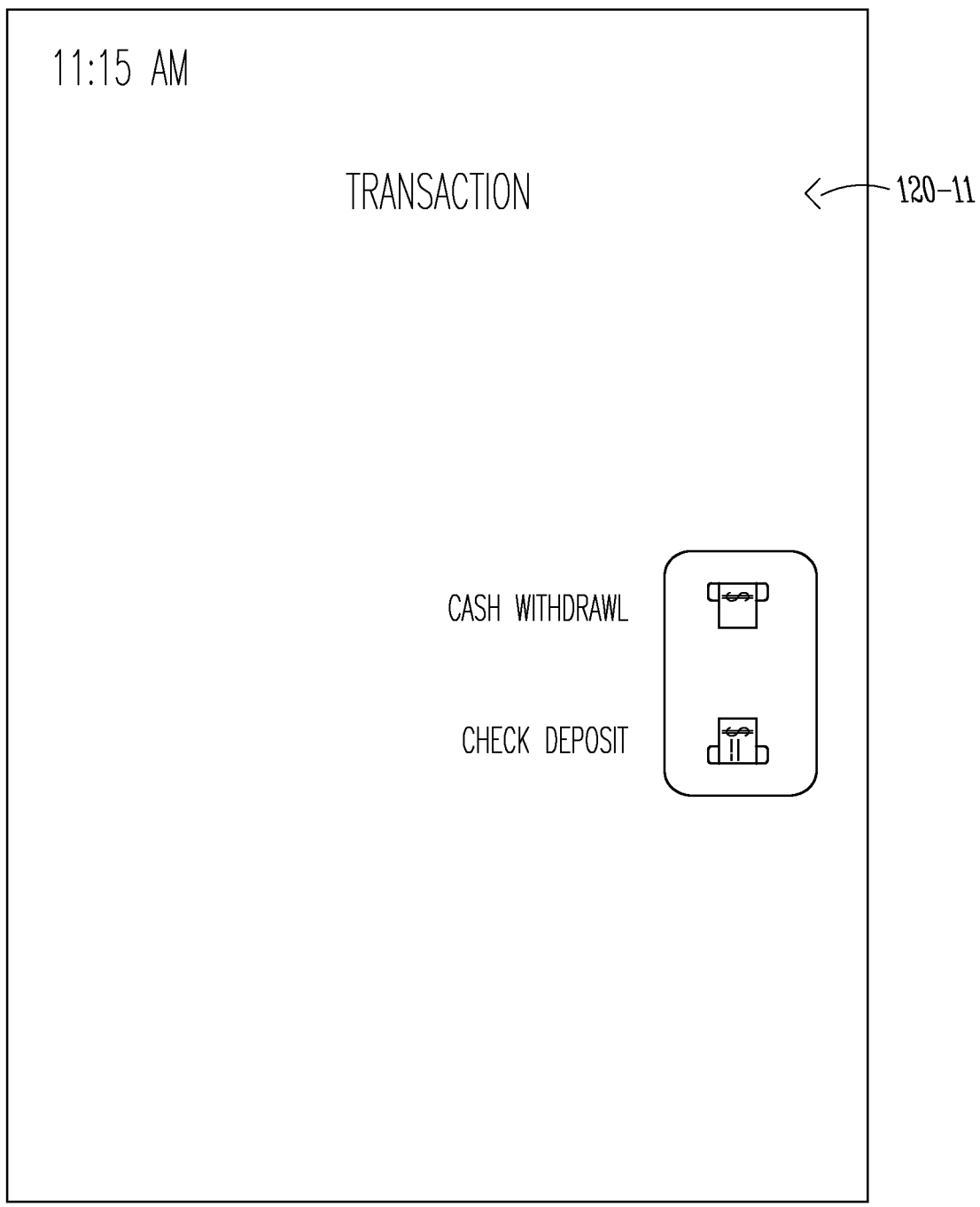
FIG. 1M is a diagram depicting a navigation feature of the liner right-handed configuration for the single-handed user interface, according to an example embodiment.

FIG. 1M is a diagram depicting a navigation feature of the liner right-handed configuration for the single-handed user interface, according to an example embodiment.

The FIG. 1M illustrates a potential rendered screen that is rendered by the interface app 113 in a right-handed mode of operation using a linear-based/centric layout when the user activates the back component icon 120-11 from the screen rendered in the FIG. 1K.

Figure 1N:
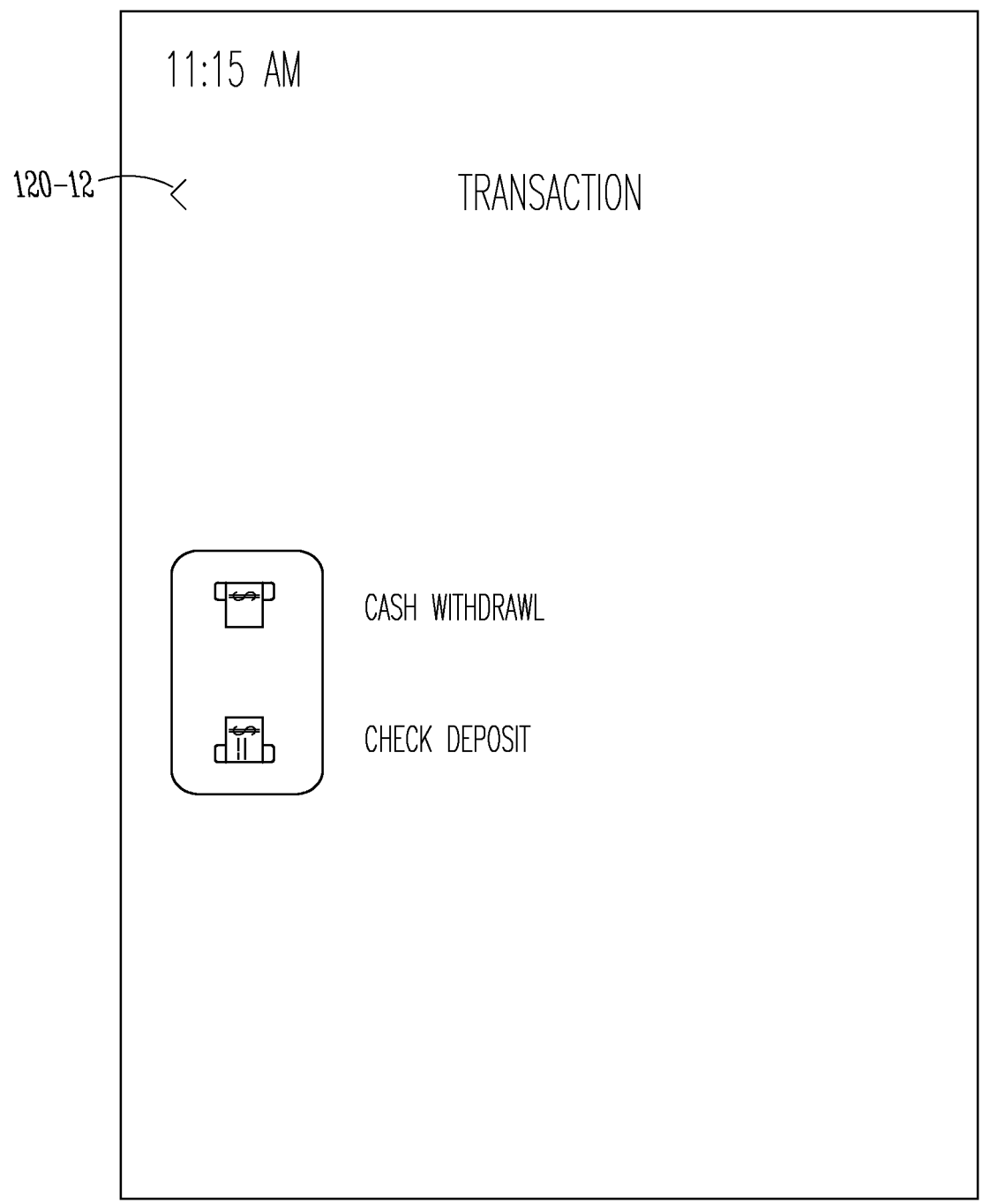
FIG. 1N is a diagram depicting the navigation feature of the liner left-handed configuration for the single-handed user interface, according to an example embodiment.

FIG. 1N is a diagram depicting the navigation feature of the liner left-handed configuration for the single-handed user interface, according to an example embodiment.

The FIG. 1N illustrates a potential rendered screen that is rendered by the interface app 113 in a left-handed mode of operation using a linear-based/centric layout when the user activates the back component icon 120-12 from the screen rendered in the FIG. 1L.

In an embodiment, device 100 is one of: a wearable processing device, a phone, a tablet, or any mobile touchscreen device.

The interface app 113 optimally renders interface components of an application 111 in a UI rendered in screens for operation and interaction by a user with a single thumb of a single hand while holding the device 100. The interface app 113 also provides for a user-selected right or left hand mode of operation. Furthermore, the interface app 113 can render the components of the application 111 in a circular-based/centric layout (as shown in the FIGS. 1A-1J) or a linear-based/centric layout (as shown in the FIGS. 1K-1N).

The above-discussed embodiments with the FIGS. 1A-1N and other embodiments are now discussed with reference to the FIGS. 2-4.

Figure 2:
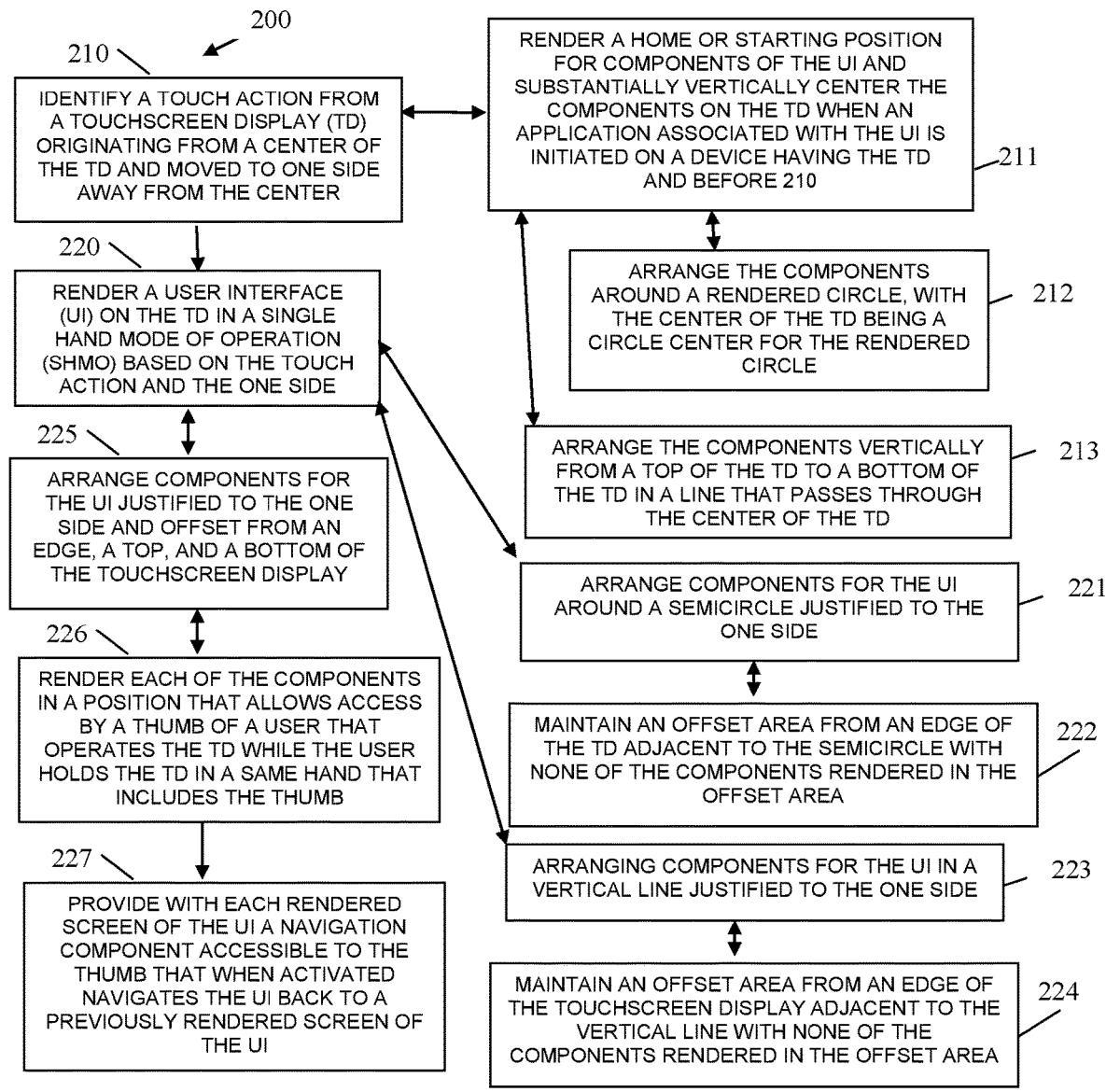
FIG. 2 is a diagram of a method for rendering the single-handed interface on a touchscreen display, according to an example embodiment.

FIG. 2 is a diagram of a method 200 for rendering and operating a single-handed user interface, according to an example embodiment. The method 200 is implemented as executable instructions for one or more software modules (referred to herein as just "interface manager"). The executable instructions reside in a non-transitory computer-readable storage medium of the device 100 and are executed by at least one hardware processor of the device. The device 100 may have one or more network connections, and the network connections may be wired, wireless, or a combination of wired and wireless.

In an embodiment, the device that executes the interface manager is the device 100. In an embodiment, the device 100 is one of: a wearable processing device, a phone, a tablet, or any mobile processing device having a touchscreen display.

In an embodiment, the interface manager is the single-handed interface application 113.

At 210, the interface manager identifies a touch action from a touchscreen display 120 that originates from a center of the touchscreen display 120 and moves to one side of the touchscreen display 120 away from the center. The touch action is a continuous touch that is released at or near the side of the touchscreen display 120. Such a touch action was illustrated in the FIGS. 1C and 1G above.

Alternatively, and in some embodiments, an initial interface screen for the application 111 includes two small icons on the bottom left corner of the touchscreen display 120 and the bottom right corner of the touchscreen display 120. When a particular on of the icons is pressed with a single touch (not a held touch or swipe touch), the interface manager configures components for the user interface (UI) for a left-handed user (bottom left icon selected) or right-handed user (bottom right icon selected).

In still another embodiment, the entire vertical center of the touchscreen display can be pressed (touched), held, and swiped to the right or left side. Responsive to this touch that originates on a center line (vertically extending from a center top to the center bottom of the touchscreen display 120) and ends at or near a right or left side of the touchscreen display 120 (hereinafter just "touchscreen 120"), the interface manager configures components for UI for a right-handed user or a left-handed user.

In an embodiment, at 211, the interface manager renders a home or starting position in an initial splash screen for the components of the UI. The components are substantially vertically centered. The initial splash screen is activated when a user selects the application 111 on the device 100 associated with the touchscreen 120 and the initial splash screen is rendered on the touchscreen 120 before the touch action is detected/identified at 210.

In an embodiment of 211 and at 212, the interface manager arranges the UI components around a rendered circle with the center of the touchscreen 120 being a center for the rendered circle (this is illustrated in the example interface screens of FIGS. 1B, 1C and 1G).

In an embodiment of 211 and at 213, the interface manager arranges the components vertically from a top to a bottom of the touchscreen 120 in a line that passed through the center of the touchscreen 120. Here, the line itself may not be visible for the rendered screen, but the interface manager maintains such a line. In an embodiment, a transparent and unobtrusive visible line is rendered so as to appear down the vertical center of the touchscreen but so as to not visibly block any portion of the icons and text information rendered with UI components within the screen.

At 220, the interface manager renders the UI on the touchscreen 120 in a single-hand mode of operation based on the touch action and rendered to the one side. This is shown in the FIGS. 1D-1F and 1H-1N above.

In an embodiment, at 221, the interface manager arranges the components for the US around a semicircle justified to the one side (shown in the FIGS. 1D-1F).

In an embodiment of 221 at 222, the interface manager maintains an offset area from an edge of the touchscreen adjacent to the rendered semicircle and justified to the one side with none of the UI components rendered in the offset area (this was illustrated by the area 120-2 (for a left-handed configuration) and 120-3 (for a right-handed configuration) in the FIGS. 1B, 1D, and 1H above).

In an embodiment, at 223, the interface manager arranges the UI components for the UI in a vertical line justified to the one side (shown in the FIGS. 1K-1N above).

In an embodiment of 223 at 224, the interface manager maintains an offset area from an edge of the touchscreen adjacent to the vertical line and justified to the one side with none of the UI components rendered in the offset area (this was illustrated by the area 120-2 (for a left-handed configuration) and 120-3 (for a right-handed configuration) in the FIGS. 1K 1D and 1L above).

In an embodiment, at 225, the interface manager arranges the UI components for the UI justified to the one side and offset from an edge, a top, and a bottom of the touchscreen 120.

In an embodiment of 225, at 226, the interface manager renders each of the UI components in a position on the touchscreen 120 that allows access by a thumb of a user that operates the touchscreen 120 while the user is also holding the touchscreen 120 in a same hand that includes the thumb (so either right-hand or left-hand depending on the touch action at 210).

In an embodiment of 226, at 227, the interface manager provides with each rendered screen of the UI a screen navigation component (illustrated as 120-11 and 120-12 in FIGS. 1K-1N above) that is accessible to the thumb and that when activated (pressed by a touch of the user's thumb) navigates the UI from a current rendered screen to a previously rendered UI screen.

Figure 3:
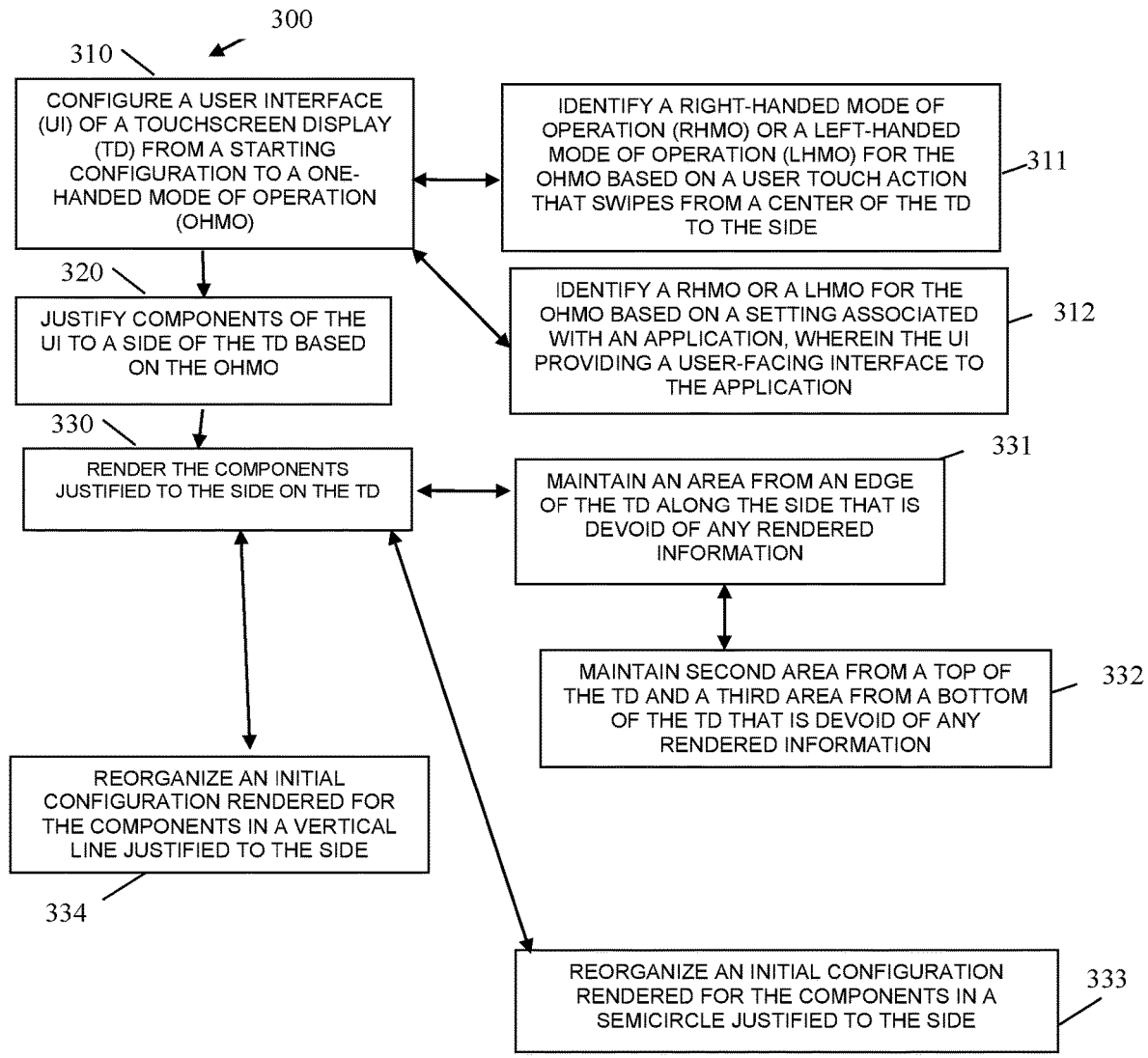
FIG. 3 is another diagram of a method for rendering the single-handed interface on a touchscreen display, according to an example embodiment.

FIG. 3 is a diagram of a method 300 for rendering and operating a single-handed user interface, according to an example embodiment. The method 300 is implemented as executable instructions for one or more software modules (referred to herein as just "interface controller"). The executable instructions reside in a non-transitory computer-readable storage medium of the device 100 and are executed by at least one hardware processor of the device. The device 100 may have one or more network connections, and the network connections may be wired, wireless, or a combination of wired and wireless.

In an embodiment, the device that executes the interface controller is the device 100. In an embodiment, the device 100 is one of: a wearable processing device, a phone, a laptop, or any mobile device having a touchscreen display.

In an embodiment, the interface controller is all or some combination of: the single-handed interface application 113 and/or the method 200.

In an embodiment, the interface controller presents another and in some ways enhanced perspective to that which was presented above with the method 200 of the FIG. 2.

At 310, the interface controller configures a UI of a touchscreen 120 from a starting configuration to a one-handed mode of operation (either right-handed mode or left-handed mode and based on user touch action and/or user profile for a user interacting with an app 111 while operating a device 100 having the touchscreen 120).

For instance and in an embodiment, at 311, the interface controller identifies a right-handed mode of operation or a left-handed mode of operation for the one-handed mode of operation based on a user touch action that swipes from a center of the touchscreen 120 to the right side or the left side of the touchscreen 120.

In an embodiment, at 312, the interface controller identifies a right-handed mode of operation or a left-handed mode of operation for the one-handed mode of operation based on a setting (for example a profile of the user) associated with the app 111. The UI being rendered by the interface controller is a user-facing interface to the features/functions provided by the app 111 on the device 100.

At 320, the interface controller justifies components of the UI to a side (right for right-handed or left for left-handed) of the touchscreen 120 based on the one-handed mode of operation configuration performed at 310.

At 330, the interface controller renders the UI components justified to the one side on the touchscreen 120 for user selection and interaction with the app 111.

In an embodiment, at 331, the interface controller maintains an area from an edge of the touchscreen 120 along the one side that is devoid of any rendered information.

In an embodiment of 331 and at 332, the interface controller maintains a second area from a top of the touchscreen 120 and a third area from a bottom of the touchscreen 120 that is also devoid of any rendered information.

The embodiments 331 and 332 account for the fact that the user is holding the device 100 that includes the touchscreen 120 in one hand and using the thumb of that hand to interact with the UI, such that a small areas on the side, top, and bottom are unreachable by the thumb (unreachable while using just the one hand). Accordingly, the interface controller ensures that such small margin areas (3—side, top, and bottom) do not include any UI components.

In an embodiment, at 333, the interface controller reorganizes an initial configuration rendered for the components in a semicircle justified to the one side (as shown in the FIGS. 1D-1F (left-handed operation) and 1H-1J (right-handed operation).

In an embodiment, at 334, the interface controller reorganizes an initial configuration rendered for the UI components in a vertical line justified to the one side (as shown in the FIGS. 1K and 1M (right-handed operation) and FIGS. 1L and 1N (left-handed operation)).

Figure 4:
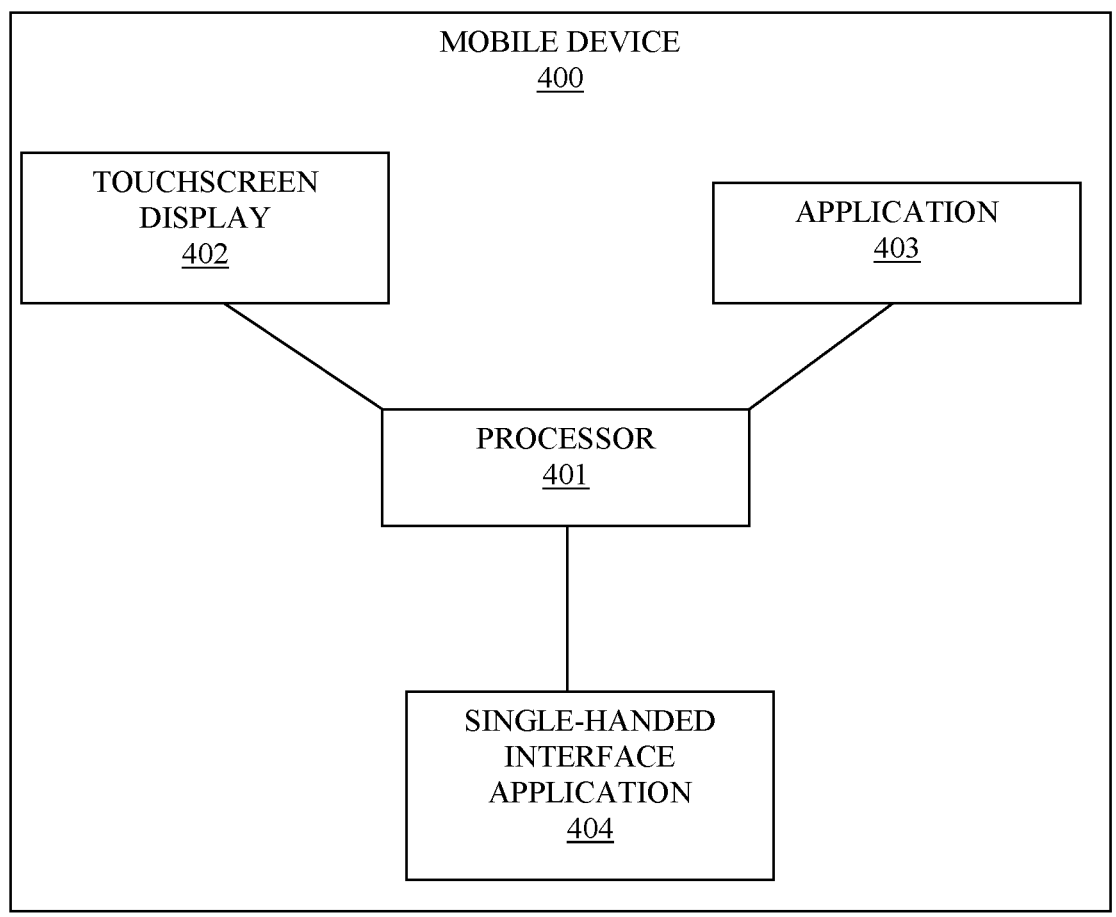
FIG. 4 is another device configured with and operating the single-handed user interface, according to an example embodiment.

FIG. 4 is a diagram of a device 400 configured with and operating the single-handed user interface, according to an example embodiment. The device 400 includes a variety of mechanical, electrical, and software/firmware components, some of which were discussed above with reference to the FIGS. 1A-1N and the FIGS. 2-3. The software components are executed on a hardware processor as executable instructions residing in a non-transitory computer-readable storage medium.

In an embodiment, the device 400 is the device 100. In an embodiment, the device 100 is one of: a phone, a wearable processing device, a tablet, or any device having a touchscreen display.

In an embodiment, the processing of the device 400 is the processing discussed above with the FIGS. 1A-1N and 2-3.

The device 400 includes: at least one processor 401, a touchscreen display 402, and a single-handed interface application 404. In an embodiment, the device 400 also includes an application 403 for which the single-handed interface application 404 provides a user-facing interface to the application 403 for user that operates the device 400.

The single-handed interface application 404 is implemented as executable instructions that are executed by the processor 401 from a non-transitory computer-readable storage medium of the device 400. Once executed, the single-handed interface application 404 performs processing to: render components of a UI substantially in a center of the touchscreen display 402; re-render the components to a user-selected side of the touchscreen display 402 for operation by a single hand of a user while the user holds the device 400; and render with each screen of the UI at least one UI-selectable navigation component reachable by the single hand within each screen.

In the embodiments presented above associated with circle-centric layout, it is to be noted that an actual visible circle is rendered. But, in some embodiments, the circle is virtual (no actual circle is visible on the rendered screen but it is maintained by the above-presented processing). The same holds true for the rendered semicircle for the one-handed mode of operation.

In the embodiments presented above associated with the linear-centric layout, it is to be noted that no actual vertical line is rendered or visible on the screen but the processing maintains and accounts for such a vertical line when laying out the UI components (in the center or to the side for a one-handed mode of operation). However, in some cases an actual visible line or faintly unobtrusively/transparently colored vertical line may be rendered that the UI components justify against.

Also, should a selectable UI component require keyboard entry, and in an embodiment, the soft keyboard may be rendered to the side for one thumb entry. The arrangement of the side-rendered soft keys can vary based on usability testing.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
rendering components of a User Interface (UI) around a perimeter of an original circle, the original circle is rendered around a center of a touchscreen display with a diameter, wherein rendering further includes generating the original circle by processing an Application Programming Interface (API) against existing components of an existing UI and rendering the existing components of the existing UI as the components around the perimeter of the original circle;
identifying a touch action from the touchscreen display originating from the center and moved from the center in a direction towards one side and away from the center;
re-rendering the components of the UI around a second perimeter of a semicircle oriented to the one side and configuring the touchscreen display in a single hand mode of operation based on the touch action directed toward the one side, wherein rendering further includes maintaining offsets from a right edge, a left edge, a top edge, a bottom edge, and the center of the touchscreen display as an offset area wherein the components of the UI are not rendered within the offset area, wherein a thumb of a user of the touchscreen display is unable to reach or access the offset area when operating the touchscreen display, wherein the thumb of the user of the touchscreen display accesses the components of the UI with just the thumb along the one side from the second perimeter of the semicircle, and wherein the diameter of the original circle is increased as the components are redistributed around the second perimeter of the semicircle;

providing user selections of the components back to the existing UI as selected ones of the existing components using the API for processing of the selected ones of the existing components by the existing UI; and changing to a different single hand mode of operation and re-rendering the components of the UI beginning at a second side that is opposite the one side and extended towards the center when a reserved touch-based option is activated by the user.

2. The method of claim 1, wherein re-rendering further includes maintaining each portion of the offset area beginning at the center and extending in a direction that is away from the one side.

3. The method of claim 1, wherein rendering the UI further includes arranging the components for the UI along the second perimeter of the semicircle and justified to the one side and offset from a first edge adjacent to the one side, the top edge, and the bottom edge of the touchscreen display.

4. The method of claim 3, wherein rendering arranging further includes rendering each of the components in a position that allows access by the thumb of the user that operates the touchscreen display while the user holds the touchscreen display in a same hand that includes the thumb.

5. The method of claim 4 further comprising, providing with each rendered screen of the UI a navigation component accessible to the thumb that when activated navigates the UI back to a previously rendered screen of the UI.

6. A method, comprising:
configuring a User Interface (UI) of a touchscreen display from a starting configuration to a one-handed mode of operation, wherein the starting configuration comprising components of the UI rendered around a perimeter of an original circle, the original circle rendered around a center of the touchscreen display with a diameter, wherein configuring further includes generating the starting configuration by processing an Application Programming Interface (API) against existing components of an existing UI and rendering the existing components of the existing UI as the components around the perimeter of the original circle;

justifying components of the UI to a side of the touchscreen display based on the one-handed mode of operation, wherein justifying further comprises rendering a semicircle and redistributing the components around a second perimeter associated with the semicircle, wherein the diameter of the original circle is increased as the components are redistributed around the second perimeter of the semicircle;

rendering the components along the second perimeter of the semicircle and justified to the side with offsets maintained from a right edge, a left edge, a top edge, and a bottom edge, and wherein an offset area occupies an opposite side from the side, wherein the offset area begins at the center of the touchscreen display and extends in a direction away from the side, and wherein the offset area does not include the components of the UI rendered in the offset area, allowing a thumb of a user of the touchscreen display to access the UI with just the thumb from the side by reaching up, reaching down, and toward the center with the thumb, wherein the thumb of the user of the touchscreen display is unable to reach or access the offset area when operating the touchscreen display;

providing user selections of the components back to the existing UI as selected ones of the existing components using the API for processing of the selected ones of the existing components by the existing UI; and changing to a different one-handed mode of operation and re-rendering the components of the UI beginning at the opposite side and extending to the center when a reserved touch-based option is activated by the user.

7. The method of claim 6, wherein configuring further includes identifying a right-handed mode of operation or a left-handed mode of operation for the one-handed mode of operation based on a user touch action that swipes from the center of the touchscreen display to the side.

8. The method of claim 6, wherein configuring further includes identifying a right-handed mode of operation or a left-handed mode of operation for the one-handed mode of operation based on a setting associated with an application, wherein the UI providing a user-facing interface to the application.

9. The method of claim 6, wherein rendering further includes maintaining the offset area from a particular edge of the touchscreen display along the side that is devoid of any rendered information.

10. The method of claim 9, wherein maintaining further includes maintaining the offset area from the top edge of the touchscreen display and from the bottom edge of the touchscreen display that is devoid of any rendered information.

11. A device, comprising:
a non-transitory computer-readable storage medium having executable instructions;
a processor; and
a touchscreen display;
wherein the executable instructions are executed on the processor from the non-transitory computer-readable storage medium and perform processing to:
render components of a User Interface (UI) in an initial mode of operation around a perimeter of an original circle, the original circle rendered with a diameter on the touchscreen display around a center of the touchscreen display, wherein the initial mode of operation is generated by processing an Application Programming Interface (API) against existing components of an existing UI and rendering the existing components of the existing UI as the components around the perimeter of the original circle;

re-render the components to a user-selected side of the touchscreen display for operation by a single hand of a user while the user holds the device, wherein the components are rendered around a second perimeter of a semicircle oriented towards the user-selected side and the diameter of the original circle is increased as the components are redistributed around the second perimeter of the semicircle;

render with each screen of the UI at least one UI-selectable navigation component reachable by a thumb of the single hand within each screen and maintaining offsets from a right edge, a left edge, and the center of the touchscreen display as an offset area that does not include any rendering of the components for the UI, allowing the thumb of the user of the touchscreen display to access the components rendered for the UI with just the thumb, wherein the thumb of the user of the touchscreen display is unable to reach or access the offset area when operating the touchscreen display;

provide user selections of the components back to the existing UI as selected ones of the existing components using the API for processing of the selected ones of the existing components by the existing UI; and changing for a different single hand of the user and re-rendering the components of the UI beginning at an opposite side from the user-selected side and extending to the center when a reserved touch-based option is activated by the user.

12. The device of claim 11, wherein touchscreen display is integrated into one of:

a wearable processing device, a phone, and a tablet.

* * * * *